United States Patent
Li (10) Patent No.: US 10,235,878 B2
(45) Date of Patent: Mar. 19, 2019

(54) INTELLIGENT TRAFFIC CLOUD CONTROL SYSTEM

(71) Applicant: KYLAND TECHNOLOGY CO., LTD., Beijing (CN)

(72) Inventor: Ping Li, Beijing (CN)

(73) Assignee: KYLAND TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 15/367,350

(22) Filed: Dec. 2, 2016

(65) Prior Publication Data
US 2018/0089996 A1 Mar. 29, 2018

(30) Foreign Application Priority Data
Sep. 26, 2016 (CN) .......................... 2016 1 0851802

(51) Int. Cl.
*H04W 84/20* (2009.01)
*G08G 1/07* (2006.01)
(Continued)

(52) U.S. Cl.
CPC .............. *G08G 1/07* (2013.01); *G08G 1/0116* (2013.01); *G08G 1/0133* (2013.01);
(Continued)

(58) Field of Classification Search
CPC ........ H04W 84/18; H04W 84/20; G08G 1/08; G08G 1/07; G08G 1/0129;
(Continued)

(56) References Cited

U.S. PATENT DOCUMENTS 4,463,339 A * 7/1984 Frick ........................ G08G 1/07 340/642
5,774,569 A * 6/1998 Waldenmaier ..... G06K 9/00771 348/143
(Continued)

FOREIGN PATENT DOCUMENTS

JP 2003-16581 A 1/2003
JP 2003-016581 A 1/2003
(Continued)

*Primary Examiner* — Benyam Haile
(74) *Attorney, Agent, or Firm* — Arent Fox LLP; Michael Fainberg (57) ABSTRACT

The application relates to an intelligent traffic cloud control system configured to acquire and centrally analyze a large amount of field data in a traffic system, and to control the traffic system. Unlike a traditional traffic directing and controlling system in such an operating mode that data are acquired and transmitted respectively by different sensing devices, and then collected, analyzed, and processed by a central system, the intelligent traffic cloud control system according to the invention analyzes and processes centrally a large amount of data through field control servers communicating over IP address based broadband buses, and performs adaptive traffic control, traffic regulation enforcement, position tracking, coordinated control, and other service functions through integrating edge computing and cloud computing at a plurality of adjacent field control servers.

10 Claims, 5 Drawing Sheets

(51) Int. Cl.
*H04L 29/12* (2006.01)
*H04L 29/08* (2006.01)
*G08G 1/01* (2006.01)
*G08G 1/081* (2006.01)
*G08G 1/00* (2006.01)
*G08G 1/08* (2006.01)
*H04W 84/18* (2009.01)

(52) U.S. Cl.
CPC ........... *G08G 1/0145* (2013.01); *G08G 1/081* (2013.01); *H04L 61/2007* (2013.01); *H04L 67/10* (2013.01); *H04W 84/20* (2013.01); *G08G 1/00* (2013.01); *G08G 1/08* (2013.01); *H04W 84/18* (2013.01)

(58) Field of Classification Search
CPC ............... G08G 1/096716; G08G 1/00; G08G 1/096783; G08G 1/056; G08G 1/09
See application file for complete search history.

(56) References Cited

U.S. PATENT DOCUMENTS

| 2008/0074289 | A1  | 3/2008  | Sauder et al. |            |
|--------------|-----|---------|---------------|------------|
| 2008/0238720 | A1* | 10/2008 | Lee           | G08G 1/081 |
|              |     |         |               | 340/909    |
| 2011/0043378 | A1  | 2/2011  | Bailey et al. |            |
| 2011/0216695 | A1* | 9/2011  | Orth          | H04W 40/00 |
|              |     |         |               | 370/328    |
| 2012/0038490 | A1* | 2/2012  | Verfuerth     | H05B 37/0272 |
|              |     |         |               | 340/910    |
| 2016/0027299 | A1* | 1/2016  | Raamot        | G08G 1/08  |
|              |     |         |               | 340/917    |

FOREIGN PATENT DOCUMENTS

| JP | 2006-259833 A | 9/2006 |
| WO | 2005/010846 A1 | 2/2005 |
| WO | 2016/127803 A1 | 8/2016 |
| WO | 2016/127950 A1 | 8/2016 |

* cited by examiner

INTELLIGENT TRAFFIC CLOUD CONTROL SYSTEM

CROSS-REFERENCES TO RELATED APPLICATIONS

This application claims the benefit of Chinese Patent Application No. 201610851802.2, filed with the State Intellectual Property Office of People's Republic of China on Sep. 26, 2016 and entitled "a method and equipment for processing information in an intelligent traffic cloud control system", which is hereby incorporated by reference in its entirety.

FIELD

The present application relates to the field of information processing, and particularly to an intelligent traffic cloud control system.

BACKGROUND

With rapid development of the social economy, various vehicles have been more and more popularity, thus greatly facilitating our traveling. However there is an increasing burden on the urban traffic management system.

Figure 1:
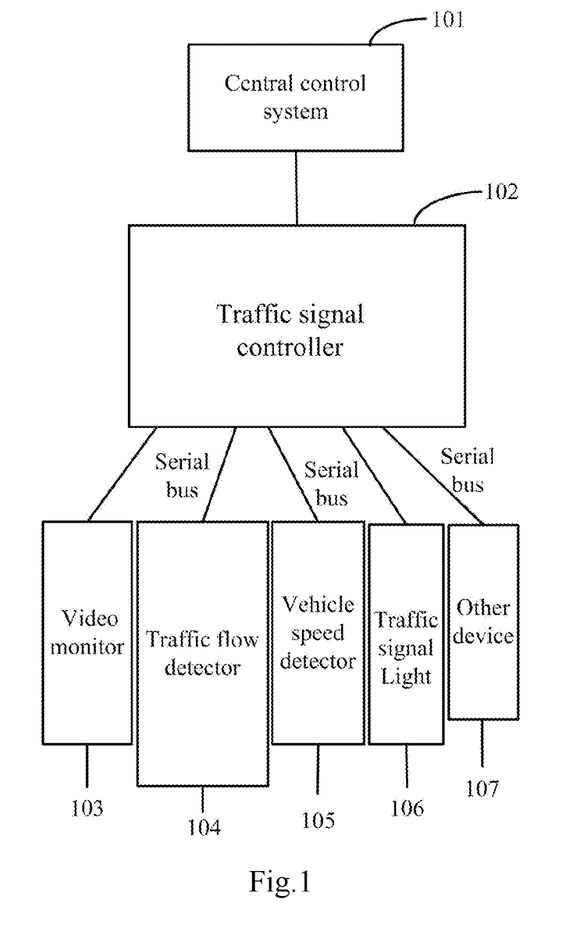
FIG. 1 illustrates a schematic diagram of the traffic management system in the prior art.

At present the urban traffic management system generally involves clearing a jammed road, monitoring regulation violation, inspection and control deployment, regulating a signal light, and other applications. As illustrated in FIG. 1, the traffic management system includes a central control system 101, a traffic signal controller 102, a video detector 103, a traffic flow detector 104, a vehicle speed detector 105, a traffic signal light 106, and other devices 107.

In the prior art, typically a traffic signal controller is arranged at each intersection. The traffic signal controller is configured to receive data acquired by a field device, and to transmit the data to the central control system. The central control system is configured to receive the data transmitted by the traffic signal controller, to generate a control instruction according to the data, and to issue the control instruction to the traffic signal controller. Furthermore the traffic signal controller is further configured to receive the control instruction issued by the central control system, and to issue the control instruction to the field device to control the field device, where the traffic signal controller typically communicates with the field device over a serial bus.

The central control system in the prior art needs to process the data, and to control the traffic signal controllers, and there are such a large amount of traffic data of all the intersections throughout the city or the district that the central control system may be overloaded, thus resulting in inefficient processing of the data, a delay in issuing the control instruction, etc.; and the traffic signal controllers communicate with the field devices over the serial bus over which the data are transferred at a relatively low speed, thus resulting inefficient transfer of the data.

SUMMARY

Embodiments of the application provide an intelligent traffic cloud control system so as to address such a problem in the prior art that the central control system needs to calculate and process the data, and to perform control, and there are such a large amount of traffic data of all the intersections throughout the city or the district that the central control system may be overloaded, thus resulting in inefficient processing of the data, a delay in issuing the control instruction, etc.; and the traffic signal controllers communicate with the field devices over the serial bus over which the data are transmitted at a relatively low speed, thus resulting inefficient transfer of the data.

An embodiment of the application provides an intelligent traffic cloud control system including: a control server arranged at each intersection, and a plurality of Internet Protocol (IP)-enabled field devices configured to communicate with the control server over an IP address based broadband bus, wherein:

the IP-enabled field devices are configured to acquire traffic intersection data; and the control server is configured to centrally process the data acquired by the IP-enabled field devices, and to control traffic in a local area through edge computing, and/or the control server is configured to determine that a preset trigger condition is satisfied, and if the control server is a master control server in a pre-created customized area including the control server, then the master control server generates a coordinated control strategy through self-learning and edge computing to perform coordinated control in the customized area; and if the control server is a slave control server, then the slave control server acquires a coordinated control strategy from a master control server through cloud computing.

BRIEF DESCRIPTION OF THE DRAWINGS

In order to make the technical solutions according to the embodiments of the application more apparent, the drawings to which a description of the embodiments refers will be briefly introduced below; and apparently the drawings to be described below are merely illustrative of some of the embodiments of the application, and those ordinarily skilled in the art can derive from these drawings other drawings without any inventive effort. In the drawings.

DETAILED DESCRIPTION OF THE EMBODIMENTS

In order to make the objects, technical solutions, and advantages of the application more apparent, the application will be described below in further details with reference to the drawings, and apparently the embodiments described below are only a part but not all of the embodiments of the application. Based upon the embodiments here of the application, all the other embodiments which can occur to those ordinarily skilled in the art without any inventive effort shall fall into the scope of the application.

Figure 2:
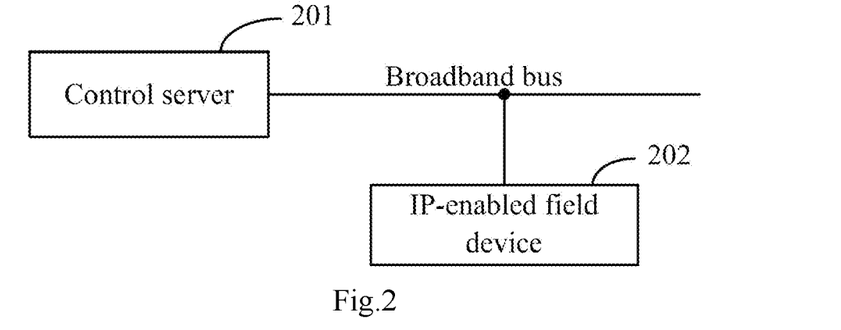
FIG. 2 illustrates a first schematic diagram of an intelligent traffic cloud control system in accordance with an embodiment of the application.

As illustrated in FIG. 2 which is a schematic diagram of an intelligent traffic cloud control system in accordance with an embodiment of the application, the intelligent traffic cloud control system includes a control server 201 arranged at each intersection, and a plurality of IP-enabled field devices 202 configured to communicate with the control server over an IP address based broadband bus, where:

The IP-enabled field devices 202 are configured to acquire traffic intersection data; and The control server 201 is configured to centrally process the data acquired by the IP-enabled field devices, and to control traffic in a local area through edge computing, and/or The control server is configured to determine that a preset trigger condition is satisfied, and if the control server is a master control server in a pre-created customized area including the control server, then the master control server generates a coordinated control strategy through self-learning and edge computing to perform coordinated control in the customized area; and if the control server is a slave control server, then the slave control server acquires a coordinated control strategy from a master control server through cloud computing.

In an embodiment, there is a control server in each local area, and in order to control the traffic in the local area, the local traffic is controlled through edge computing in such a way that the control server analyzes and stores the acquired data, generates a control instruction on the IP-enabled field device, and transmits the control instruction to the IP-enabled field device over the broadband bus for execution. In this way, the traffic in the local area is controlled.

In an embodiment, for example, the preset trigger condition is that the control server controlling the data fails to process all the data because there are a large amount of data. In another example, there is such a traffic jam that a plurality of control servers need to coordinate to manage the traffic. In still another example, information about an object to be inquired about, in a customized area is inquired about, for example, a motion locus of the object to be inquired about, in the customized area is inquired about.

In an embodiment, there are a master control server and a plurality of slave control servers in the customized area. The pre-created customized area can be created before the control server processes the data acquired by the IP-enabled field device, for example, local areas where 10 adjacent control servers are located are formed as a customized area. Alternatively the pre-created customized area can be created automatically as needed during the control server processing the data acquired by the IP-enabled field device. For example, if a trigger condition to create a customized area is satisfied, then a request to create a customized area may be transmitted to an adjacent control server, and if the adjacent control server accepts the request, then the customized area may be created. Of course, alternatively the adjacent control server receiving the request to create a customized area can request an adjacent control server proximate thereto to create a customized area to thereby extend the customized area constantly.

In an embodiment, in order to facilitate control on the customized area, the customized area is consisted of local areas of a plurality of control servers adjacent in position.

In an embodiment, coordinated control includes traffic regulation enforcement, locus tracking, traffic control, and positioning of an object to be positioned.

In traffic regulation enforcement, for example, the control server receives data for traffic regulation enforcement acquired by the IP-enabled field device, and analyzes the data for a traffic regulation violation event in the customized area, e.g., a red-light running event.

In locus tracking, for example, the control server receives data for locus tracking acquired by the IP-enabled field device, and analyzes the data for the locus of a tracked object.

In traffic control, for example, the control server receives data for traffic control acquired by the IP-enabled field device, analyzes the data, and generates a control instruction to control the IP-enabled field device to perform a corresponding operation; for example, to control an interval of time at which red, green, and yellow traffic signal lights in the customized area are switched on alternately, and in another example, to control an interval of time at which a red-light running photograph device in the customized area takes a picture once.

In positioning of an object to be positioned, for example, the control server receives data for positioning the object to be positioned, acquired by the IP-enabled field device, analyzes the data, and obtains a positioning result of the object to be positioned, according to a result of the analysis. The positioning result can be historical data of the object to be positioned, or can be the current position thereof, although the embodiment of the application will not be limited thereto.

If the control server is a master control server, then the master control server can share data of a slave control server, and then analyze and process its own data and the shared data, generate a coordinated control strategy, and transmit the coordinated control strategy to the slave control server for enforcement, so that the slave control server can control its own IP-enabled field device according to the coordinated control strategy. That is, the master control server and the slave control server thus coordinately control the customized area.

If the control server is a slave control server, then the slave control server transmits the data acquired by the IP-enabled field device (the data can be all the data acquired by the IP-enabled field device, or can be specified data among the data) to the master control server, so that the master control server generates a coordinated control strategy according to the data, where the specified data can vary from one object to be controlled coordinately to another. For example, if locus tracking needs to be controlled coordinately, then locus data of an object for which a motion locus needs to be determined is transmitted to the master control server; and if traffic control needs to be controlled coordinately, then current traffic jam condition data is transmitted to the master control server. In a particular implementation, the specified data can be determined as needed in reality, although the embodiment of the application will not be limited thereto.

In the system according to the embodiments of the application, the control server is configured to centrally process the data acquired by the IP-enabled field device, and to control the traffic in the local area through edge computing, and/or the control server is configured to determine that the preset trigger condition is satisfied, and if the control server is a master control server in the pre-created customized area including the control server, then the master control server generates the coordinated control strategy through self-learning and edge computing, and performs coordinated control in the customized area; and if the control server is a slave control server, then the slave control server acquires the coordinated control strategy from a master control server through cloud computing. Since the control server functions to process the data, to control the traffic in the local area, and to perform coordinated control on the traffic in the customized area to thereby alleviate the burden on the central system, and even dispense with the central system. Moreover there is such a control server at each intersection that only controls the traffic in the local area or the customized area, so there are a small amount of data to be processed, thus improving the efficiency of processing the data, and addressing the problem of a delaying in issuing the instruction.

In order to further understand the intelligent traffic cloud control system according to the embodiments of the application, the intelligent traffic cloud control system will be further described below:

In an embodiment, there are complex traffic conditions in respective areas in a city, so traffic conditions at respective intersections sometimes need to be analyzed as a whole for coordinated control on the respective intersections which may or may not be at least two adjacent intersections. In view of this, in an embodiment of the application, the customized area includes a local area of the control server, and a local area of other specified control server than the control server; and coordinated control on the traffic in the customized area is performed through self-learning and edge computing by sharing data of the specified control server, generating a coordinated control strategy according to the shared data of the specified control server, and controlling the traffic in the customized area according to the coordinated control strategy, where the control servers in the customized area store the data in a distributed manner. The data can be stored in the distributed manner instead of being stored centrally in a dedicated storage device to thereby save hardware resources. Also the control server can perform a corresponding operation on its own historical data, for example, inquire about data, etc.

For example, a control server A at an intersection A in Hai Dian District, Beijing, and a control server B at an intersection B in Chang Ping District, Beijing share data of each other. If there is a jam at the intersection A, and there is a smooth road condition at the intersection B, then the control server A analyzes and processes the shared data of the control server B, and its own data as a whole, generates a first control instruction for an IP-enabled field device at the intersection A, and a second control instruction for an IP-enabled field device at the intersection B, and transmit the second control instruction to the control server B, so that the IP-enabled field devices at the two intersections perform corresponding operations in response to the corresponding control instructions for the purpose of clearing the intersection A.

In an embodiment, if there are a plurality of control servers in a customized area, then one of the control servers is selected as a master control server to control traffic in the customized area. For example, there are 5 control servers A, B, C, D, and E in a customized area, and if there is smooth traffic at the intersection B, and there are a small amount of data, acquired by an IP-enabled field device, to be processed by the control server B; and there are jams at the other four intersections, and there are large amounts of data to be processed by their corresponding control servers, then the control server B is selected at this time as a master control server. That is, the least loaded control server in the customized area is selected as the master control server, where the master control server can be selected in any manner as needed in reality. For example, the master control server can alternatively be determined by the control servers in the customized area as a result of negotiation between them, where in an embodiment, the master server can alternatively be determined as a result of competition and election in a particular implementation. For example, the respective control servers in the customized area can compete for the same lock, and if one of the control servers is the first one to gain the lock, then that control server is the master control server, and the other control servers become slave control servers automatically.

In an embodiment, the IP-enabled field device includes a first IP-enabled field device and/or a second IP-enabled field device, where the first IP-enabled field device is an intelligent field device supporting the IP protocol; and the second IP-enabled field device includes a driver device supporting the IP protocol, and a non-intelligent field device, which does not support the IP protocol, connected with the driver device. The driver device is configured to receive a control instruction transmitted by the control server, to control the corresponding non-intelligent field device in response to the instruction, and to transmit data acquired by the non-intelligent field device to the control server, so that with the driver device, the control server can control the field device which does not supporting the IP protocol.

In an embodiment, in order to improve the speed of processing data in the intelligent traffic cloud control system, the control server in the embodiment of the application is provided with dual CPUs (Central Processing Unitrotocol, Central Processing Units).

In an embodiment, there is a large traffic road network throughout the city or the two, and there are a large number of field devices (e.g., signal lights) on the respective roads, where a corresponding operation sometimes needs to be performed according to the traffic condition throughout the city or the district, so in the embodiment of the application, the intelligent traffic cloud control system further includes a central system configured to exchange data with the plurality of control servers over a network, to share the data stored in the control servers connected therewith, and to analyze and process the shared data to obtain a result of the analysis; and to generate a coordinated control strategy according to the result of the analysis, and to transmit the coordinated control strategy to the corresponding control servers; and The control servers are further configured to acquire the coordinated control strategy from the central system through cloud computing, and to perform corresponding operations according to the coordinated control strategy.

The central system can communicate with master control servers in a plurality of customized areas, and issue the coordinated control strategy to the master control servers, and the master control server can issue the coordinated control strategy to the slave control servers to control the IP-enabled field devices in the respective customized areas to perform corresponding operations; or the central system can communicate directly with the respective control servers (including the master control servers and the slave control servers) in the respective customized areas, and issue the coordinated control strategy to the slave control servers to control the IP-enabled field devices to perform corresponding operations for the purpose of controlling the traffic in the plurality of customized areas.

For example, the central system acquires first data preset for traffic regulation enforcement from the plurality of control servers communicating therewith, analyzes the first data, generates a traffic regulation enforcement strategy according to a result of the analysis, and transmits the traffic regulation enforcement strategy to the corresponding servers for enforcement.

In another example, the central system acquires second data preset for locus tracking from the plurality of control servers communicating therewith, and analyzes the second data for the locus of a tracked object.

In still another example, the central system acquires third data preset for coordinated traffic control from the plurality of control servers communicating therewith, analyzes the third data, generates a generalized coordinated control strategy according to a result of the analysis, and transmits the generalized coordinated control strategy to the corresponding control servers. For example, the central system can perform generalized coordinated control throughout the city or the district, where generalized coordinated control can relate to any level of district, e.g., a city, a district (e.g., Hai Dian District), and of course, a geographical area to be controlled can be determined as needed in reality in a particular implementation, although the embodiment of the application will not be limited thereto. For example, since there are frequently traffic jams in Hai Dian District, Beijing, the central system can analyze data transmitted by a specified control server in Hai Dian District for a road condition in the district, and further transmit a corresponding control instruction to the corresponding control servers in the district. The control instruction is issued by the control servers to the corresponding IP-enabled field devices in the district, so that the IP-enabled field devices perform corresponding operations for the purpose of clearing the traffic flow in Hai Dian District so as to alleviate the traffic jams in Hai Dian District.

In a further example, the central system acquires fourth data preset for positioning from the plurality of control servers communicating therewith, analyzes the fourth data, and obtains a positioning result of an object to be positioned, according to a result of the analysis.

The central system transmits the coordinated control strategy to the corresponding control servers, so that the control servers transmits the coordinated control strategy to the IP-enabled field devices over the broadband bus to thereby control the IP-enabled field devices.

The central system is configured to perform coordinated control in a large area, and the control servers in the customized area are configured to perform coordinated control in the customized area, where the range of the large area is larger than the customized area. For example, the large area is the entire city of Beijing, and the customized area is Hai Dian District, Chang Ping District, etc., in the city of Beijing.

If there are two central systems, then one of the central systems can be determined as a backup central system of the other central system to back up data of the other central system. Of course, alternatively more than one central system can be selected as backup central systems.

In an embodiment, the central system receives state data of the control servers in real time, and statistic and inquiry data of the control servers in a non-real time manner, and subscribes as needed to the stored data of the control servers. In order to enable the central system to control the control servers, and further the corresponding IP-enabled field devices, the central system receives the state data of the control servers in real time. The statistic and inquiry data may not be required to be highly real-time, for example, data for inquiring about the traffic flow may not be required to be transmitted to the central system in real time, so the data which may not be required to be highly real-time can be received in the non-real time manner. The central system can be further configured to transmit a message subscription instruction, which can include a type of message for subscription, to a control server; and the central system can be further configured to analyze subscribed data received from the control server, and perform a corresponding operation according to a result of analyzing the data. For example, the corresponding operation can be to store the data, to generate a control instruction to control the IP-enabled field device, etc. if the central system serves a plurality of control servers, then the generated control instruction can enable the traffic in the service area to be controlled globally.

In an embodiment, the central system is configured to analyze and process the data through cloud computing, and generate the coordinated control strategy to thereby save the cost, improve the capacity of data processing, and reduce energy consumption.

In an embodiment, there is a broadband bus in one traffic direction, and for each traffic direction, the control server communicates with the IP-enabled field device in the traffic direction over the broadband bus in the traffic direction. For example, if there are four traffic directions which are A, B, C, and D respectively, and there are four network lines which are A1, B1, C1, and D1 respectively, then in a particular implementation, the network line A1 may be configured for the direction A, the network line B1 may be configured for the direction B, the network line C1 may be configured for the direction C, and the network line D1 may be configured for the direction D, thus facilitating the routing.

Alternatively a common broadband bus can be configured for all the traffic directions of an intersection, and the control server communicates with the IP-enabled field device at the intersection over the common broadband bus. For example, if there are four traffic directions which are A, B, C, and D respectively, then a common network line A1 can be configured for these four traffic directions.

In an embodiment, there is a very complex traffic road network in the city, and field devices on respective roads sometimes need to perform corresponding operations according to traffic conditions of the other roads in a corresponding area; and if the control server fails, then another control server may take the place of the failing control server, so in the embodiment of the application, the control server is further configured to back up data of a control server connected therewith, and to take the place of the failing control server connected therewith.

In order to facilitate understanding of the application, such an example will be given here that for example, the control server A is a control server at the intersection of a road A, and the control server B is a control server at the intersection of a road B; and the control servers A and B are connected over a network, and back up data of each other. Sometimes there is a traffic jam on the road A, whereas the adjacent road B is very smooth, so that the control server A can analyze the backup data of the road B of the control server B, and determine that the road B is smooth; and the control server B can also analyze the backup data of the road A of the control server A, and determine a traffic jam on the road A, so the control servers A and B control corresponding field devices to perform corresponding operations, according to their results of the analyzing the data. If the control server A fails, then the control server B possessing all the data of the control server B operates in place of the control server A to thereby control the IP-enabled field device served by the control server A.

In an embodiment, in a particular implementation, IP addresses of the respective IP-enabled field devices can be allocated by the central system, or can be set by an administer. Of course, in order to facilitate control on the field devices, in an embodiment of the application, the control server is further configured to allocate a unique IP address for the IP-enabled field device communicating therewith. Furthermore in order to improve the security of the system, the control server is further configured to detect the security of the network.

In an embodiment, in order to enable the central system to receive the data of the control server; and to enable the control instruction to be transmitted to the control server timely, and to further control accurately the IP-enabled field device to perform the corresponding operation, the control server is synchronized with the central system in a clock synchronization mechanism, thus improving the accuracy of generalized coordinated control.

In an embodiment, in order to facilitate management on the traffic at the respective intersections, there is a control server at each intersection, and the respective control servers are connected with their corresponding specified control servers over the network, where the specified control server is a control server at an adjacent intersection, and/or a control server included in an instruction issued by the user to configured the specified control server, so that in a particular implementation, the different control servers can communicate as needed in reality. The control server can communicate with each other to thereby facilitate traffic management, and management on the traffic data so as to deploy intelligent traffic in a smart city.

In an embodiment, the control server communicates with the IP-enabled field device through addressing using an IP address, where the data are addressed over an underlying link using the IP address.

In an embodiment, the control server is upgraded from a traditional signal controller with a simplex function to a traffic cloud control server integrated with network security, traffic information perceiving, and high-performance data processing, storage, and control to perform real-time intelligent traffic detection through video monitoring while avoiding the drawbacks of complex routing, a large structure, slow processing, and the simplex function. The control server includes two functionally different PowerPC four-core industry Central Processing Units (CPUs), which are a first CPU and a second CPU respectively;

The second CPU is configured to receive the traffic data provided by the IP-enabled field device, and to transmit the traffic data to the first CPU; and to receive a first control instruction generated by the first CPU, and to control and manage the IP-enabled field device in response to the first control instruction.

Optionally the first CPU is further configured to:

Generate data to be processed to the central system, based upon a result of analyzing and processing the data received from the second CPU, and to send the data to be processed to the central system;

The second CPU is further configured to:

Receive a second control instruction issued by the central system, and to control and manage the IP-enabled field device in response to the second control instruction.

Optionally the control server further includes:

A network switching module is configured to obtain the data transmitted by the IP-enabled field device, and to transmit the data to the second CPU, and further configured to receive the first control instruction or the second control instruction issued by the second CPU, and to transmit the first control instruction or the second control instruction to the IP-enabled field device.

Optionally the control server further includes:

A network security module is configured to transmit the data to be processed, generated by the first CPU to the central system, and further configured to receive the second control instruction issued by the central system to the second CPU.

Optionally the second CPU includes: a signal control module configured to detect a signal control state of the IP-enabled field device, and to transmit the signal control state to a signal optimizing module of the first CPU; and a traffic detecting module configured to detect vehicle information acquired by the IP-enabled field device, and to transmit the vehicle information to the signal optimizing module of the first CPU; and The first CPU includes the signal optimizing module configured to optimize the control state of the IP-enabled field device based upon the signal control state transmitted by the signal controlling module, and the vehicle information transmitted by the traffic detecting module, and to generate the first control instruction.

Optionally the first CPU further includes:

A traffic data processing module is configured to analyze and process the signal control state transmitted by the signal controlling module, and the vehicle data transmitted by the traffic detecting module, to generate the data to be processed, to be provided to the central system, and to transmit the data to be processed to the central system; and The signal controlling module is further configured to receive the second control instruction issued by the central system, and to control and manage the field device in response to the second control instruction.

Optionally the first CPU further includes:

A video stream processing module is configured to perform a video analysis and process on vehicle video data transmitted by the traffic detecting module, to generate video data to be processed, to be provided to the central system, and to transmit the video data to be processed to the central system.

Optionally the first CPU further includes:

A regulation violation data processing module is configured to analyze the vehicle data transmitted by the traffic detecting module for a regulation violation behavior, to generate regulation violation data to be processed, to be provided to the central system, and to transmit the regulation violation data to the central system.

Optionally the control server further includes:

A node interacting module is configured to be connected over a network, to interact with the other control servers, and to control in a coordinated mode, and/or to take over a failure.

Thus the control server communicates the data with the field device in an IP-enabled mode over the network, and performs image monitoring, data acquisition, cloud computing, cloud storage, cloud control, and other functions, to thereby make the system greatly reduced in volume, and improve the speed of data processing, and the real-time characteristic of the control instruction. Also the central system performs high-performance coordinated directing and scheduling, operational and maintenance management, and integrated data analysis functions, thus resulting in a more intelligent traffic control system.

In an embodiment, there is a very large traffic road network in the city, and there are a very large number of field devices, thus resulting in a very large amount of traffic data, so that it may be very difficult for the user to inquire about information about some device and/or some control server at some intersection. In order to facilitate an operation by the user, in the embodiment of the application, each IP-enabled field device is provided with a user customized name; and/or each control server is provided with a user customized name.

Particularly the central system and/or the control server is configured to provide a data retrieval service, where the central system can store the received data in correspondence to the user customized name of the device transmitting the data (the IP-enabled field device and/or the control server); and retrieve the data as a result of a retrieving operation by the user, and then display the retrieved data, and the corresponding user customized name to the user. The control server can also store the received data in correspondence to the user customized name of the device transmitting the data; and retrieve the data as a result of a retrieving operation by the user, and then display the retrieved data, and the corresponding user customized name to the user. Thus if the user retrieves data from some IP-enabled field device or control server, then the central system or the control server may display the customized name of the corresponding device, and the corresponding data to the user, so that the user can know the data of which device are displayed. For example:

The user can define the name of a signal light as a signal light of Cheng Fu Road No. 1 in Hai Dian District, so that the data are displayed in such a way that the user can have the user customized name correspond to the signal light at the real geographical position, and thus know it conveniently.

The user can define the name of a control server as Cheng Fu Road in Hai Dian District, so that the data are displayed in such a way that the user can have the user customized name correspond to the control server at the real geographical position, and thus know it conveniently.

In an embodiment, in order to facilitate construction, the control server further includes a power supply configured to power the driver device and the intelligent field device over a power supply line.

Figure 3:
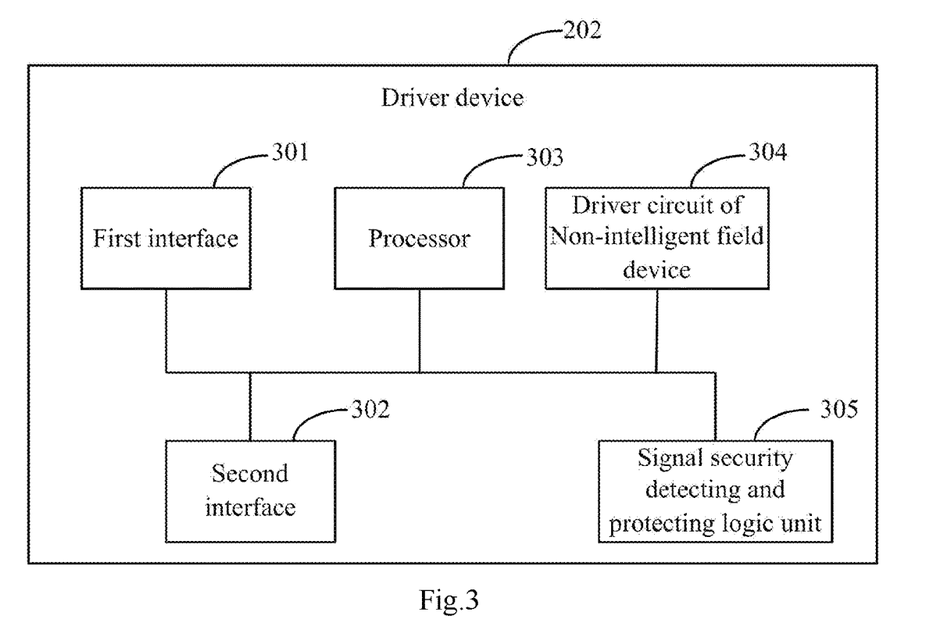
FIG. 3 illustrates a schematic diagram of a driver device in accordance with an embodiment of the application.

As illustrated in FIG. 3, there is a schematic structural diagram of a driver device according to an embodiment of the application, where the driver device includes:

A first interface 301 is configured to be connected with a broadband bus, e.g., a two-wire industrial Ethernet, where the first interface is a two-wire industrial Ethernet interface for accessing the two-wire industrial Ethernet, for example;

A second interface 302 is configured to be connected with a non-intelligent field device, where the second interface is a Registered Jack (network interface), for example;

A processor 303 is configured to process data transmitted by the non-intelligent field device, and an instruction transmitted by the control server; and A driver circuit 304 of non-intelligent field device.

In an embodiment, the driver device can further include a signal security detecting and protecting logic unit 305, where signal security detecting is to detect an acquired signal for security to thereby ensure the acquired signal to be secured, for example. The protecting logic unit can be configured to guarantee the security of the driver device and/or the non-intelligent field device upon determining an accident or abnormality occurring.

In a particular implementation, the driver device can include at least one of a light group driver, a detecting device driver, and a driver for other non-intelligent field devices than the light group driver, and the detecting device driver.

In a particular implementation, the intelligent field device can include a video monitoring device, a regulation violation monitoring device, and a dedicated short-range communication device.

Figure 4:
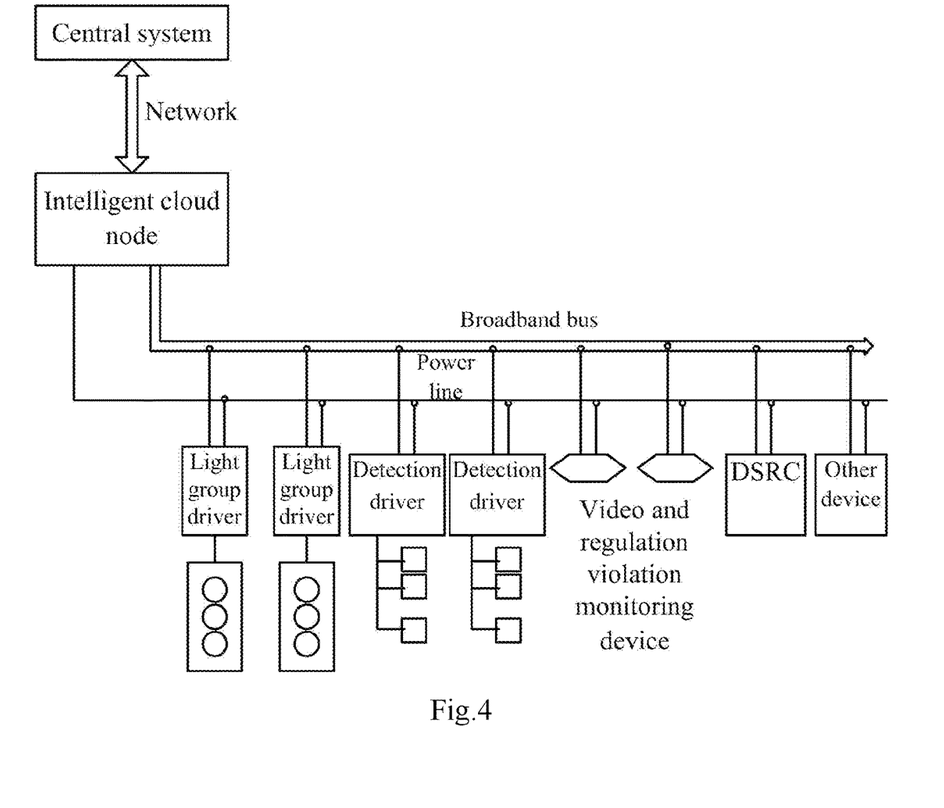
FIG. 4 illustrates a second schematic diagram of an intelligent traffic cloud control system in accordance with an embodiment of the application.

In order to facilitate further understanding of the intelligent traffic cloud control system according to the embodiments of the application, the structure of the system may be described here in connection with a particular embodiment, and as illustrated in FIG. 4, in the embodiment of the application, the central system performs generalized coordinated control through the control servers, and the control server at each intersection communicates with the intelligent field device and the driver device in each traffic direction of the intersection over a broadband bus, in the corresponding traffic direction, where the network line can be a two-wire industrial Ethernet, or any other network over which communication can be conducted in the IP protocol; and the control server powers the driver device and the intelligent field device over a power supply line.

Figure 5:
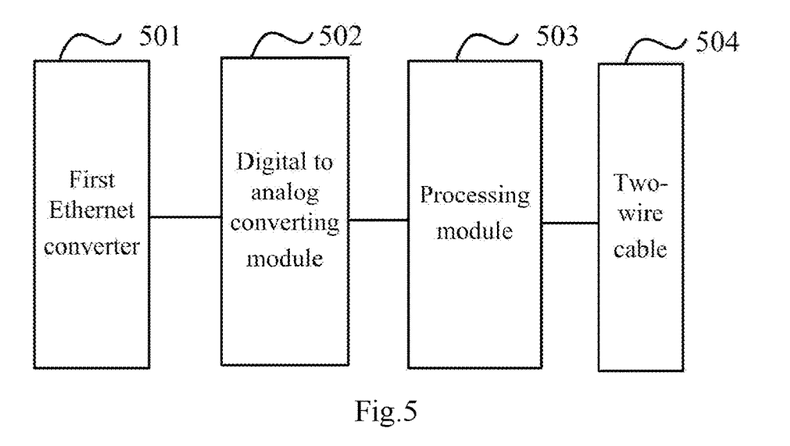
FIG. 5 illustrates a first schematic structural diagram of a two-wire industrial Ethernet in accordance with an embodiment of the application.

In an embodiment, FIG. 5 illustrates a schematic structural diagram of the two-wire industrial Ethernet including:

A first Ethernet converter 501 is configured to convert a standard Ethernet signal transmitted over a category 5 twisted pair cable into an Ethernet frame signal;

A digital to analog converting module 502 is configured to digital to analog convert the Ethernet frame signal into a digitally formatted signal to be transmitted over a power line;

A processing module 503 is configured to rectify, filter, and amplify the digitally formatted signal into a signal complying with a broadband power line specification;

In an embodiment, the broadband power line is a Homeplug AV power line, for example; and A two-wire cable 504 is configured to transmit the signal complying with the broadband power line specification.

In an embodiment, the two-wire cable is Profibus, CAN, Modbus, a 485 bus, HART (analog), FSK, FF, or any other common two-wire cable, for example.

There are the respective devices (including the driver devices and the intelligent field devices) connected with the two-wire cable 504, so a signal can be transmitted over the two-wire cable 504 to at least one device connected with the two-wire cable 504.

Figure 6:
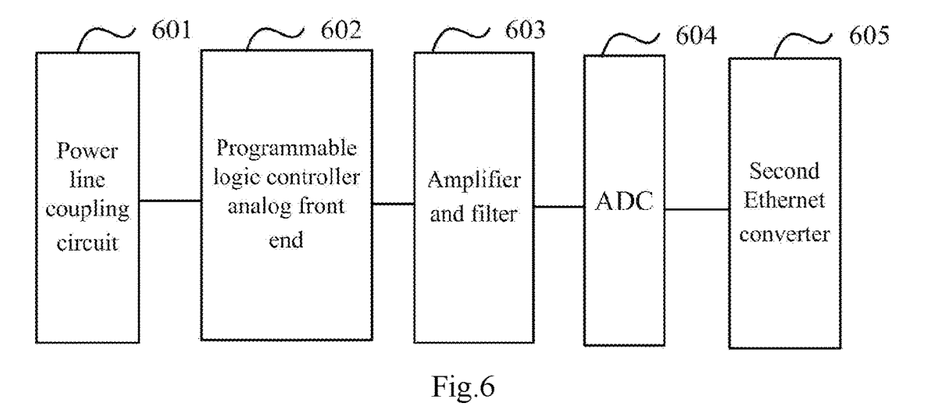
FIG. 6 illustrates a second schematic structural diagram of a two-wire industrial Ethernet in accordance with an embodiment of the application.

FIG. 5 illustrates a structure of a two-wire industrial Ethernet over which a signal is transmitted to a subordinate connection device and FIG. 6 illustrates another schematic structural diagram of the two-wire industrial Ethernet over which a signal transmitted by the subordinate connection device is received, particularly as follows:

A power line coupling circuit 601 is configured to transmit a programmable logic controller waveform at low voltage and a high frequency over the two-wire cable to a programmable logic controller analog front end;

The programmable logic controller analog front end 602 is configured to filter out the PLC from the received signal by a band-pass filter, and transmit the filtered signal to an amplifying filter;

The amplifier and filter 603 is configured to amplify, filter, and then transmit the signal to an Analog to Digital Converter (ADC);

The ADC 604 is configured to convert the received signal into a digital signal, and to transmit the digital signal to an Ethernet converter; and The second Ethernet converter 605 is configured to convert the received signal into an Ethernet frame signal, and to convert the Ethernet frame signal into a standard Ethernet signal to be transmitted over the category 5 twisted pair cable.

Thus the two-wire cable can be regarded as a cable like a CAN bus, so the two-wire industrial Ethernet can be the bus in the traffic control system as illustrated in FIG. 1 so as to update the traffic control system to the intelligent traffic cloud control system according to the embodiments of the application while avoiding the traditional traffic control system from being significantly modified, for example, the two-wire cable for communication from being modified.

Of course, in a particular implementation, any two-wire cable supporting the two-wire industrial Ethernet will be applicable to the embodiments of the application, so the embodiments of the application will not be limited to the two-wire cable above.

Those skilled in the art shall appreciate that the embodiments of the application can be embodied as a method, a system or a computer program product. Therefore the application can be embodied in the form of an all-hardware embodiment, an all-software embodiment or an embodiment of software and hardware in combination. Furthermore the application can be embodied in the form of a computer program product embodied in one or more computer useable storage mediums (including but not limited to a disk memory, a CD-ROM, an optical memory, etc.) in which computer useable program codes are contained.

The application has been described in a flow chart and/or a block diagram of the method, the device (system) and the computer program product according to the embodiments of the application. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the application have been described, those skilled in the art benefiting from the underlying inventive concept can make additional modifications and variations to these embodiments. Therefore the appended claims are intended to be construed as encompassing the preferred embodiments and all the modifications and variations coming into the scope of the application.

Evidently those skilled in the art can make various modifications and variations to the application without departing from the spirit and scope of the application. Thus the application is also intended to encompass these modifications and variations thereto so long as the modifications and variations come into the scope of the claims appended to the application and their equivalents.

The invention claimed is:
1. An intelligent traffic cloud control system, comprising:
a plurality of control servers, each of the plurality of control servers arranged at a separate intersection;
a plurality of IP-enabled field devices configured to communicate with the plurality of control servers over an IP address based broadband bus; and
a central system configured to exchange data with the plurality of control servers over a network; wherein:
the central system is configured to: receive status data of the plurality of control servers in real time, receive statistic and inquired data from the plurality of control servers in a non-real time manner, and subscribe to stored data of the plurality of control servers when needed;
the IP-enabled field devices are configured to collect traffic intersection data; and
each of the plurality of the control servers is configured to control traffic in a local area by: analyzing and storing the data collected by one or more IP-enabled field devices communicating with the control server, generating one or more control instructions for the one or more IP-enabled field devices, and transmitting the one or more control instructions to the one or more IP-enabled field devices so that the one or more IP-enabled field devices perform one or more operations according to the one or more control instructions, and when determining that a preset trigger condition is satisfied: determine a pre-determined customized area comprising the control server, and negotiate with one or more other control servers in the pre-determined customized area to determine a master control server in the pre-determined customized area, or, contend for becoming the master control server among all control servers in the pre-determined customized area; wherein:
any control server in the pre-determined customized area which is not the master control server is a slave control server in the pre-determined customized area;
determining that the preset trigger condition is satisfied, comprises:
when determining that an amount of data to be processed is greater than a preset data amount, determining that the preset trigger condition is satisfied; or, when determining that a traffic jam occurs in the pre-determined customized area, determining that the preset trigger condition is satisfied; or, when determining that information about an object in the pre-determined customized area needs to be inquired about, determining that the preset trigger condition is satisfied;
the pre-determined customized area comprises:
a customized area determined by an operator before the control server analyzes and stores the data collected by the one or more IP-enabled field devices; a customized area automatically determined when the control server analyzes and stores the data collected by the one or more IP-enabled field devices according to needs; or, a customized area determined when the control server receives a request to determine the customized area and requests one or more adjacent control servers proximate thereto to determine the customized area; and
if the control server is the master control server in the pre-determined customized area, then the control server is further configured to generate a coordinated control strategy through self-learning and edge computing to perform coordinated control in the customized area by sharing data of one or more slave control servers, analyzing and processing the shared data; or if the control server is the slave control server, then the control server is further configured to acquire a coordinated control strategy from the master control server through cloud computing.

2. The system according to claim 1, wherein for each traffic direction at an intersection, one of the plurality of control servers at the intersection communicates with the one or more IP-enabled field devices in the traffic direction over one IP address based broadband bus in the traffic direction; or
one of the plurality of control servers at an intersection communicates with one or more IP-enabled field devices in all directions at the intersection over one common IP address based broadband bus.

3. The system according to claim 1, wherein the customized area consists of local areas of a plurality of control servers adjacent in position; and
the coordinated control strategy is configured for: traffic regulation enforcement, locus tracking, traffic control, and locating of an object to be located.

4. The system according to claim 3, wherein the central system is further configured to:
share data stored in the plurality of control servers, analyze and process the shared data to obtain a result of the analysis; generate a coordinated control strategy according to the result of the analysis, and transmit the coordinated control strategy to the plurality of corresponding control servers; and
the plurality of control servers are further configured to obtain the coordinated control strategy from the central system through cloud computing, and perform corresponding operations according to the coordinated control strategy.

5. The system according to claim 1, wherein the customized area comprises the local area of the control server, and one or more local areas of one or more specified control servers different from the control server; and
the control servers in the customized area store data in a distributed manner.

6. The system according to claim 1, wherein the plurality of IP-enabled field devices comprise a first IP-enabled field device and/or a second IP-enabled field device, wherein:
the first IP-enabled field device is an intelligent field device supporting the IP; and
the second IP-enabled field device comprises a driver device supporting the IP, and a non-intelligent field device, connected with the driver device, wherein the non-intelligent field device does not support the IP.

7. The system according to claim 6, wherein each of the plurality of control servers is further configured to:
allocate a unique IP address for each IP-enabled field device communicating the control server.

8. The system according to claim 3, wherein each of the plurality of control servers is further configured to back up data of a control server connected therewith, and take the place of a failing control server connected therewith.

9. The system according to claim 2, wherein each of the plurality of IP-enabled field devices comprises a first IP-enabled field device and/or a second IP-enabled field device, wherein:
the first IP-enabled field device is an intelligent field device supporting the IP protocol; and
the second IP-enabled field device comprises a driver device supporting the IP protocol, and a non-intelligent field device, which does not support the IP protocol, connected with the driver device.

10. The system according to claim 1, wherein each of the plurality of the IP-enabled field devices comprises a first IP-enabled field device and/or a second IP-enabled field device, wherein:
the first IP-enabled field device is an intelligent field device supporting the IP protocol; and
the second IP-enabled field device comprises a driver device supporting the IP protocol, and a non-intelligent field device, which does not support the IP protocol, connected with the driver device.

* * * * *